United States Patent
Yap et al.

(10) Patent No.: US 10,955,730 B2
(45) Date of Patent: Mar. 23, 2021

(54) MULTI-CONFIGURATION MOUNTING SYSTEM

(71) Applicant: GoPro, Inc., San Mateo, CA (US)

(72) Inventors: Derek Yap, San Carlos, CA (US); Joshua T. Druker, Redwood City, CA (US)

(73) Assignee: GoPro, Inc., San Mateo, CA (US)

( * ) Notice: Subject to any disclaimer, the term of this patent is extended or adjusted under 35 U.S.C. 154(b) by 48 days.

(21) Appl. No.: 16/137,983

(22) Filed: Sep. 21, 2018

(65) Prior Publication Data

US 2019/0094664 A1 Mar. 28, 2019

Related U.S. Application Data

(60) Provisional application No. 62/563,313, filed on Sep. 26, 2017.

(51) Int. Cl.
*G03B 17/56* (2006.01)
*F16M 11/08* (2006.01)
*F16M 13/04* (2006.01)

(52) U.S. Cl.
CPC .......... *G03B 17/561* (2013.01); *F16M 11/08* (2013.01); *F16M 13/04* (2013.01); *G03B 17/563* (2013.01); *G03B 17/566* (2013.01)

(58) Field of Classification Search
CPC ........ A45F 3/04; G03B 17/561; G03B 17/566
See application file for complete search history.

(56) References Cited

U.S. PATENT DOCUMENTS

| | | | | |
|---|---|---|---|---|
| 5,517,696 A | * | 5/1996 | Krugler | A41D 27/20 2/250 |
| 5,833,100 A | * | 11/1998 | Kim | A45F 5/02 224/197 |
| 6,478,205 B1 | * | 11/2002 | Fujihashi | A45F 5/02 224/236 |
| 7,111,812 B2 | * | 9/2006 | Shannon | H04M 1/04 248/227.3 |
| 9,814,287 B1 | * | 11/2017 | Perez Vazquez | A45B 19/02 |
| 9,913,527 B1 | * | 3/2018 | Merton, Sr. | H04R 1/08 |
| 2005/0194411 A1 | * | 9/2005 | Cooke | A45F 5/021 223/91 |
| 2005/0284904 A1 | * | 12/2005 | Knapp | H04B 1/385 224/269 |
| 2008/0099642 A1 | * | 5/2008 | Schoonover | B62J 9/21 248/230.1 |
| 2011/0130174 A1 | * | 6/2011 | Kroupa | H04M 1/15 455/569.1 |
| 2012/0223111 A1 | * | 9/2012 | Jones | A45F 5/02 224/194 |

FOREIGN PATENT DOCUMENTS

JP 2001329413 A * 11/2001 ........... A41D 27/205

* cited by examiner

*Primary Examiner* — Noam Reisner
(74) *Attorney, Agent, or Firm* — Young Basile Hanlon & MacFarlane, P.C.

(57) ABSTRACT

A multi-configuration mounting system has been disclosed. The multi-configuration mounting system comprises an adapter configured to couple to a first device, and a receptacle defining an opening within a surface of the adapter. The receptacle receives a tab of a clip housing that secures a second device, thereby forming an interference fit between the tab and the receptacle to couple the second device to the first device via the adapter.

12 Claims, 12 Drawing Sheets

MULTI-CONFIGURATION MOUNTING SYSTEM

CROSS REFERENCE TO RELATED APPLICATIONS

This application claims the benefit of U.S. Provisional Application No. 62/563,313, filed Sep. 26, 2017, the contents of which are incorporated by reference herein in its entirety.

FIELD OF THE INVENTION

This application relates to the field of cameras and in particular to a multi-configuration mounting system for cameras, camera accessories, and other devices.

BACKGROUND

Cameras, camera accessories, and other devices can be mounted to a variety of surfaces and structures. Typical mounts are limited in terms of interchangeability (e.g., only being able to receive devices using one type of coupling mechanism) and do not provide easy and seamless usage of the devices. In certain situations, such as when using multiple devices to capture various footage, it is desirable to be able to easily secure and remove the devices for usage. The present disclosure addresses such a need.

SUMMARY

The present disclosure discloses a multi-configuration mounting system for cameras, camera accessories, and other devices.

In one aspect, the multi-configuration mounting system can comprise an adapter configured to couple a first device and a receptacle defining an opening within a surface of the adapter. The receptacle can receive a tab of a clip housing that secures a second device, thereby forming an interference fit between the tab and the receptacle to couple the second device to the first device via the adapter.

In another aspect, the multi-configuration mounting system is included within an imaging device mount that can comprise a handle that includes an adapter with a receptacle that defines an opening within a surface of the adapter. The receptacle can receive a tab associated with a second device. The imaging device mount can further comprise an arm movably secured to the handle such that the arm can be rotated relative to the handle and secured in place. The arm can comprise a plurality of segments that are movably secured to each other. The imaging device mount can further comprise a mount head movably secured to the arm such that the mount head can be rotated relative to the handle and secured in place. The mount head can be configured to mount an imaging device.

These and other aspects of the present disclosure are disclosed in the following detailed description of the embodiments, the appended claims and the accompanying drawings.

BRIEF DESCRIPTION OF THE DRAWINGS

The disclosed technology is best understood from the following detailed description when read in conjunction with the accompanying drawings (figures). It is emphasized that, according to common practice, the various features of the drawings are not to-scale. On the contrary, the dimensions of the various features are arbitrarily expanded or reduced for clarity.

DETAILED DESCRIPTION

The following description relates to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable, similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

When a user captures footage, being able to easily secure and access various devices can provide numerous advantages. A user that is engaged in a certain activity (e.g., bicycling down a road, skiing down a mountain, surfing in the ocean, hiking up a trail, etc.) may want to be able to easily switch between camera devices and/or various associated accessories at different times throughout the activity or at different parts of the activity. For example, while paddling in the ocean, the user may want to use a camera situated in a mouthguard, whereas while surfing a wave, the user may want to use a camera mounted by a camera grip.

During various activities, switching between various devices and the transport of these devices can be difficult.

The present disclosure provides a multi-configuration mounting system that can be easily integrated into a first device of a variety of different types (e.g., an imaging device mount, a backpack, an article of clothing, etc.) to provide an easy, efficient, and streamlined mechanism to secure/remove a second device of varying types (e.g., a remote controller, an imaging device, a clip housing, etc.) to/from the multi-configuration mounting system. The multi-configuration mounting system can be coupled to the first device using a variety of mechanisms (e.g., being molded or sewn into the first device) and can receive a corresponding tab associated with the second device via a receptacle formed within an adapter of the multi-configuration mounting system to enable the second device to be coupled to the first device. The receptacle can have a universal shape (e.g., a rigid shape) to receive a plurality of different tabs having varying shapes that are inserted thereby forming a plurality of fits including but not limited to an interference fit, an active mechanical fit, and a passive mechanical fit. The shape of the receptacle can also vary depending upon the shape of the received tab (i.e., the shape of the receptacle corresponds to each different tab shape).

Figure 1:
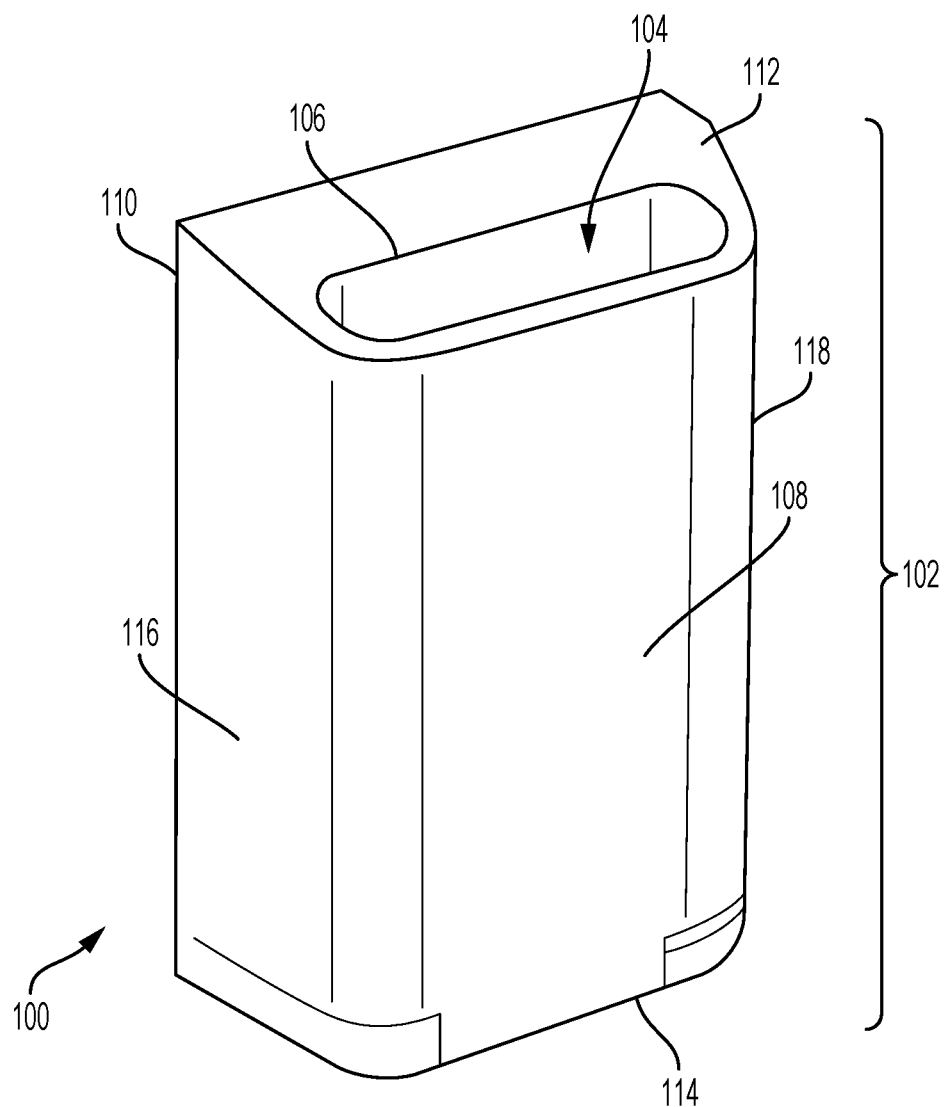
FIG. 1 illustrates a multi-configuration mounting system in accordance with an embodiment of the present disclosure.

FIG. 1 illustrates a multi-configuration mounting system 100 in accordance with an embodiment of the present disclosure. The multi-configuration mounting system 100 includes an adapter 102 and a receptacle 104 within a surface of the adapter 102. The multi-configuration mounting system 100 can include additional receptacles in addition to the receptacle 104 within the adapter 102 to enable a variety of devices to be received and secured. The adapter 102 can be integrated within and/or coupled to a first device including but not limited to a rigid device and a flexible device. The rigid device can comprise an image mounting device and other devices made of a rigid structure (e.g., a rigid plastic structure) and the flexible device can comprise a backpack and other devices made of a flexible structure (e.g., a fabric-based or a rubber-based structure).

In FIG. 1, the adapter 102 serves as a housing that surrounds the receptacle 104. The receptacle 104 defines an opening 106 within the surface of the adapter 102 to enable the receptacle 104 to receive another device. The receptacle 104 can also be referred to as a slot and the opening 106 can also be referred to as a slot opening. For example, the adapter 102 can receive (via the opening 106 of the receptacle 104) a second device indirectly using a tab of an intermediate device or structure that is removably couple-able to the second device, such as a clip housing (not shown) that secures/houses the second device. The second device can be secured by the clip housing using a frame that is coupled to the tab. In another example, the adapter 102 can receive the second device directly (and without usage of the intermediate device or structure, such as the clip housing) if the second device includes a tab or similar structure that can be inserted into the receptacle 104. The adapter 102 can have a plurality of surfaces (also referred to as faces or sides) with at least some of the plurality of surfaces being accessible or visible. The adapter 102 includes a front surface 108, a back surface 110 (not fully shown), a top surface 112, a bottom surface 114 (not fully shown), a first side surface 116, and a second side surface 118 (not fully shown). The back surface 110 may not be accessible if the adapter 102 is coupled to the first device via the back surface 110.

In some embodiments, the receptacle 104 defines the opening 106 within the top surface 112 of the adapter 102. The opening 106 can be defined within any of the surfaces (e.g., the front surface 108, the back surface 110, the top surface 112, the bottom surface 114, the first side surface 116, or the second side surface 118) of the adapter 102. Both the receptacle 104 and the opening 106 can have varying dimensions, shapes, and/or sizes. For example, in some embodiments, the opening 106 can have a wider opening or a larger opening in comparison to other embodiments where the opening 106 has a narrower opening or a smaller opening. As another example, the receptacle 104 can be shaped similarly from top to bottom, can be tapered from top to bottom, or can have certain patterns or grooves on the inside. The receptacle 104 can be designed to serve as a universal receptacle with one predetermined shape or design (e.g., a rigid shape) that can receive a wide variety of tabs or insertion structures that come in varying dimensions, shapes, and/or sizes.

Figure 2:
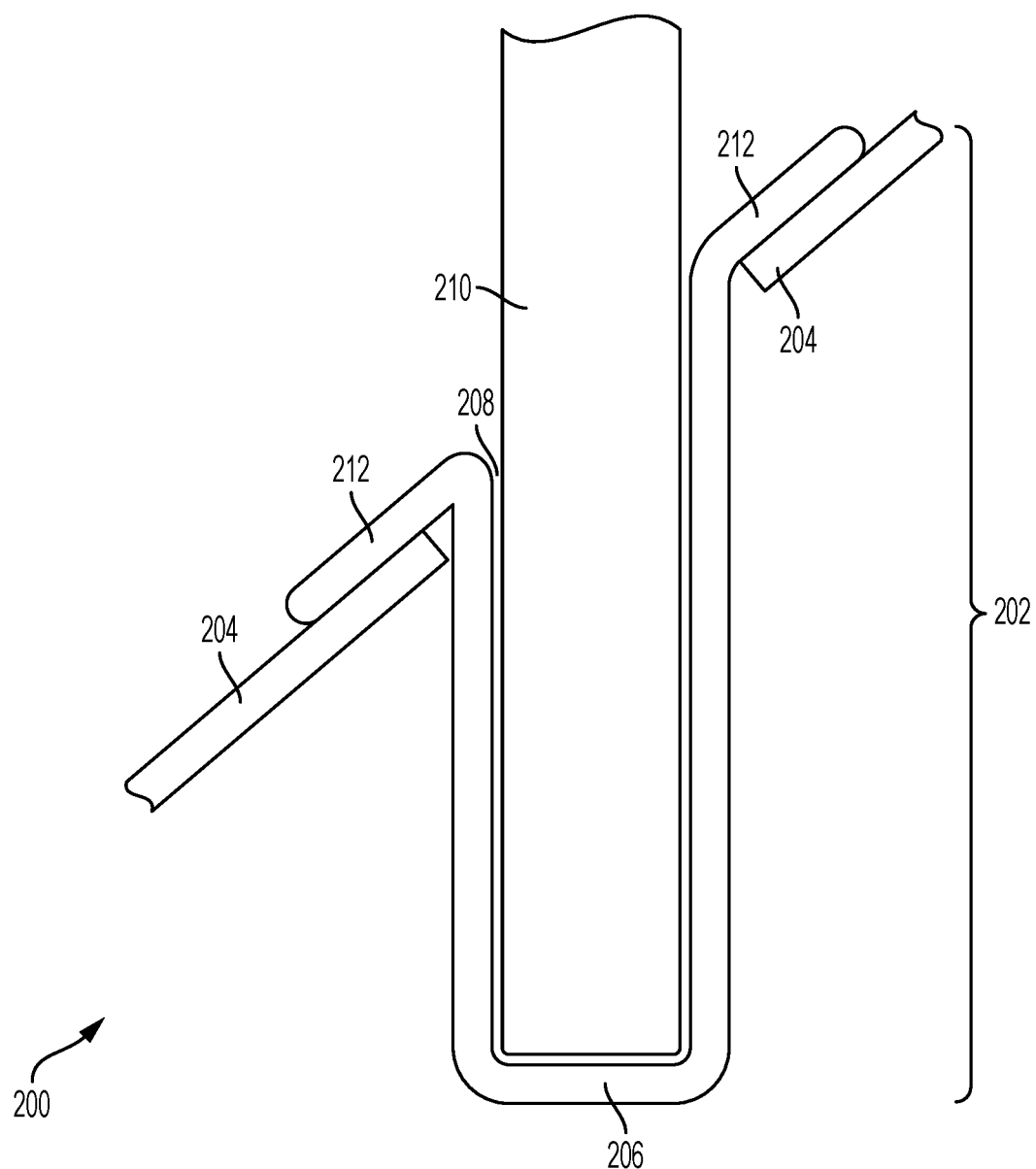
FIG. 2 illustrates a multi-configuration mounting system in accordance with an embodiment of the present disclosure.

FIG. 2 illustrates a multi-configuration mounting system 200 in accordance with an embodiment of the present disclosure. In FIG. 2, a cross-section view of the multi-configuration mounting system 200 is depicted. The multi-configuration mounting system 200 includes an adapter 202 coupled to a surface 204 of a first device thereby interfacing the adapter 202 with the first device. The first device can be a flexible device including but not limited to a backpack and a carrying case. The multi-configuration mounting system 200 further includes a receptacle 206 that defines an opening 208 within the adapter 202. A portion 210 (e.g., a tab) of a second device can be inserted into the receptacle 206 to couple the second device to the first device via the adapter 202. The portion 210 can be a tab or a similar insertion structure. The portion 210 may extend downward from an upper portion (e.g., an upper end or region) of the second device, for example, being spaced apart a short distance from a rear of a body of the device. The portion 210 may, as shown, have a generally rectangular cross-sectional shape (e.g., having a width extending left-to-right that is greater than a thickness extending front-to-back). The portion 210 may also be elongated, for example, having a length (e.g., measured top-to-bottom) that is greater than the width and the thickness of the portion 210.

The second device can be an intermediary device such as a clip housing that secures another device (e.g., an imaging device, a remote accessory, etc.). The second device can also be the other device (e.g., the imaging device, the remote accessory, etc.) that is being secured to the flexible device via the adapter 202 of the multi-configuring mounting system 200. If the second device is an intermediary device like the clip housing, the other device (e.g., imaging device) is indirectly secured to the first device (e.g., backpack) via the adapter 202. If the second device is the other device and no intermediary device is used, the second device is directly secured to the first device via the adapter 202. The first device can also be a hybrid device with a plurality of flexible and rigid plastic portions so that the multi-configuration mounting system 200 can be coupled to at least one of the flexible portions of the first device.

In some embodiments, the portion 210 is a tab that has a shape that is flexible and that comprises a compliant material including but not limited to rubber. A shape that is flexible (also referred to as a shape that is conforming, compliant, variable, dynamic, etc.) can refer to a shape that can change into various shapes based on varying conditions. The portion 210 can be fully composed of a compliant material or can have a hybrid composition such as a compliant material outer shell with a rigid inner shell or core (e.g., rubber overmolded onto a plastic core). The portion 210 can have a shape that is a predetermined percentage larger than a shape of the receptacle 206 so that when the portion 210 is inserted into the receptacle 206, it is secured via an interference fit. For example, the shape of the portion 210 can be 1%, 2%, 3%, 4%, or 5% larger than the shape of the receptacle 206 at corresponding positions, such that the portion 210 is compressed by the receptacle 206 when inserted therein. The shape of the portion 210 can be larger than the shape of the receptacle 206 by various other percentages that can be either less than 1% or greater than 5%. The receptacle 206 can have a rigid structure including but not limited to a rigid plastic structure.

The second device (e.g., the imaging device) can be coupled to the first device (e.g., the backpack) when the portion 210 of the second device is inserted into the receptacle 206 of the adapter 202 that interfaces with the first device. The coupling of the portion 210 (i.e., tab) that is compliant into the receptacle 206 (i.e., slot) that is rigid can be achieved using a friction fit which is also referred to as an interference fit. In some embodiments, the portion 210 is a tab that comprises a rigid structure (as opposed to a compliant material) that is sized and shaped to correspond with the size and the shape of the receptacle 206. The portion 210 can snap into place (e.g., via internal slots of the receptacle) within the receptacle 206 when inserted to provide a locking mechanism. The portion 210 can have a shape that results in an active mechanical fit when the portion 210 is inserted into the receptacle 206 or the portion 210 can have a shape that results in a passive mechanical fit when the portion 210 is inserted into the receptacle 206. The shape of the portion 210 that results in the active mechanical fit can include an active connection mechanism (e.g., including but not limited to a quick release buckle). The shape of the portion 210 that results in the passive mechanical fit can include a passive connection mechanism (e.g., including but not limited to sprung bulb bearings).

An active mechanical fit and a passive mechanical fit are two types of fits formed when a tab is inserted into a receptacle. Other fit types can also be formed between the tab and the receptacle. The active mechanical fit is generated using a tab that has an active connection mechanism (e.g., a quick release buckle) that requires additional user engagement (e.g., pressing sides of the quick release buckle) with the active connection mechanism to release the tab from the receptacle. The passive mechanical fit is generated using a tab that has a passive connection mechanism (e.g., sprung bulb bearings) that does not require additional user engagement with the passive connection mechanism to release the tab from the receptacle. Instead, when the tab is inserted into the receptacle, the passive connection mechanism of the tab (e.g., sprung bulb bearings) can move within the receptacle to hold a detent within the tab (or vice versa) or forms a passive mechanical fit based on spring pressure. Examples of the active mechanical fit and the passive mechanical fit are discussed in further detail below with respect to FIG. 12.

The adapter 202 can comprise a plurality of different materials and combinations of materials. For example, the adapter 202 can comprise a flexible material (e.g., a fabric or a rubber material) near a flapped area 212 of the adapter 202 that is coupled to the surface 204 of the first device. The flapped area 212 can be located on either side of the opening 208 defined by the receptacle 206 of the adapter 202 or the flapped area 212 can just be on one side of the opening 208. The flapped area 212 can include a variety of different shapes and sizes that enable the adapter 202 to be coupled to the first device via the surface 204 of the first device.

The adapter 202 can be coupled to the surface 204 of the first device via a variety of mechanisms including but not limited to being sewn into the surface 204. The surface 204 of the first device can also include an opening or a gap for the receptacle 206 of the adapter 202 to be easily inserted within when the adapter 202 is coupled to the surface 204. The surface 204 of the first device can also entirely wrap around the receptacle 206 of the adapter 202 instead of coming in contact only with the flapped area 212 as shown in FIG. 2. In some embodiments, only the flapped area 212 of the adapter 202 is sewn into the surface 204 of the first device. In other embodiments, the adapter 202 can be coupled to the first device via other areas in addition to the flapped area 212 and using other mechanisms in addition to being sewn (e.g., adhesives).

An adapter of the multi-configuration mounting system (e.g., the adapter 102 of the multi-configuration mounting system 100 of FIG. 1) can be integrated (e.g., molded) into a variety of devices including but not limited to imaging device mounts. An imaging device mount can be used three ways: as an imaging device or camera grip, as an extension arm, or as a tripod. The imaging device mount can include a folding arm with multiple segments that can be used for point of view (POV) or follow-cam footage and that enables easy capture of selfies without the imaging device mount appearing in the footage. When detached from the folding arm, a handle of the imaging device mount can serve as a camera grip. When the folding arm is extended and still attached to the handle, the imaging device mount can be used like a pole mount for immersive POV or follow-cam footage. A lightweight and mini tripod can be stored within the handle and used for static tripod shots. Other devices including but not limited to batteries, mounts, remote controllers, and displays can also be stored within the handle. The imaging device mount can expand to a predetermined length (e.g., approximately 60 centimeters (cm)) and can collapse to a predetermined length (e.g., approximately 20 cm). The imaging device mount can be made from lightweight, waterproof, dust-proof, and damage proof materials.

Figure 3:
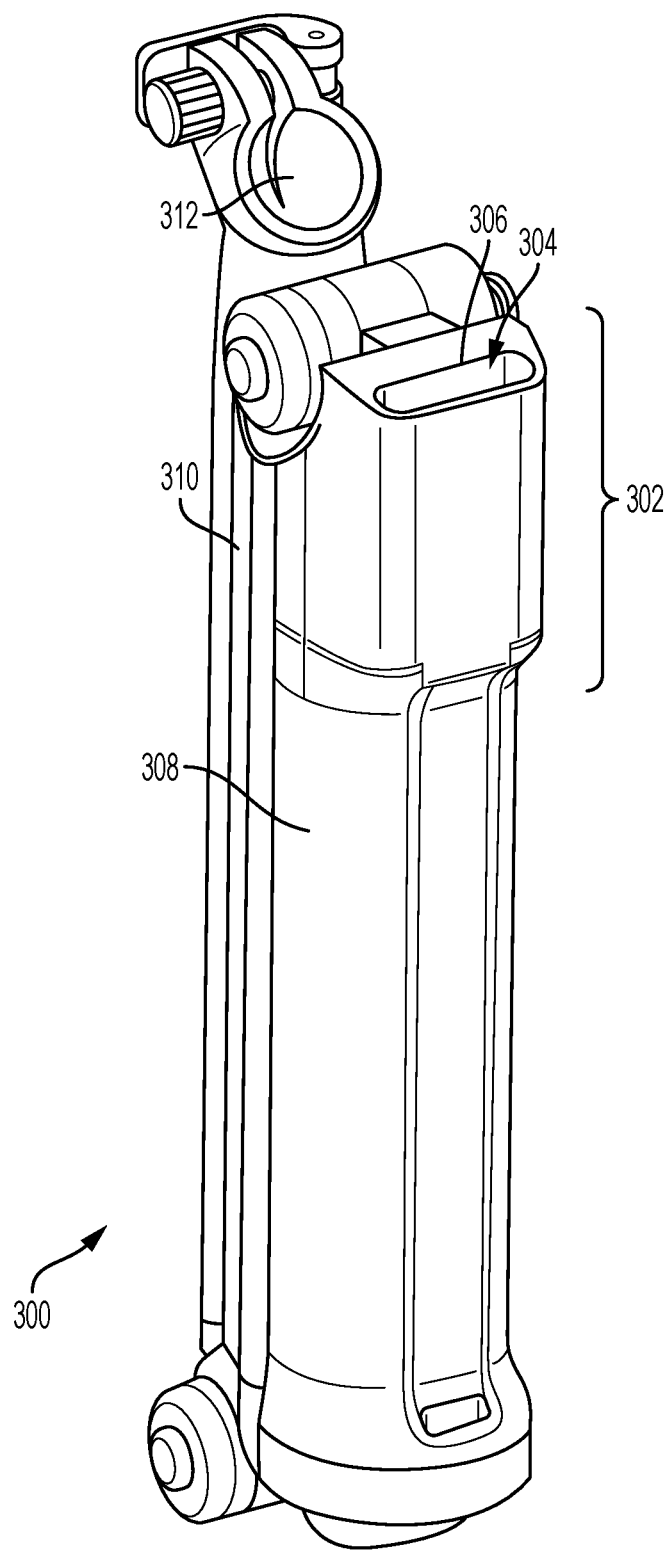
FIG. 3 illustrates an imaging device mount that includes an adapter of a multi-configuration mounting system in accordance with an embodiment of the present disclosure.

FIG. 3 illustrates an imaging device mount 300 that includes an adapter 302 of a multi-configuration mounting system in accordance with an embodiment of the present disclosure. The adapter 302 of the multi-configuration mounting system can be similar to the adapter 102 of the multi-configuration mounting system 100 of FIG. 1. The imaging device mount 300 includes a receptacle 304 that defines an opening 306 within a top surface of the adapter 302. The top surface of the adapter 302 can be slanted downwards or in different directions. The imaging device mount 300 further includes a handle 308 coupled to the adapter 302, an arm 310 coupled to the handle 308, and a mount head 312 coupled to the arm 310.

In some implementations, the imaging device mount 300 only comprises the adapter 302 and the mount head 312 both coupled to the handle 308 and therefore does not include the arm 310. In some implementations, the imaging device mount 300 only comprises the adapter 302 coupled to the handle 308 and therefore does not include either the arm 310 or the mount head 312.

The arm 310 can be a folding arm with a plurality of segments that are movably secured with each other using a variety of mechanisms. The arm 310 can also include a single segment that is extendable or not extendable. The arm 310 can be movably secured to the handle 308 such that the arm 310 can be rotated relative to the handle 308 and secured in place. The mount head 312 can be movably secured to the arm 310 such that the mount head 312 can be rotated relative to the handle 308 and secured in place. The mount head 312 is configurable to mount a variety of different devices including but not limited to an imaging device (i.e., a camera). The imaging device can include but is not limited to any of a digital camera, a GoPro camera, and a smartphone camera.

The handle 308 can comprise a rigid structure such as a rigid plastic structure and the adapter 302 can be molded as a rigid plastic structure into the handle 308. The adapter 302 can comprise a different material other than a rigid plastic structure and can be molded or coupled to the handle 308 using a variety of mechanisms (e.g., clips). The adapter 302 comprising a rigid plastic structure can be molded into a top end of a front surface of the handle 308 and can be molded into a variety of shapes including but not limited to a shape that protrudes outwards from the top end of the front surface of the handle 308. The top end can be above a grip portion near a lower end of the handle 308. The grip portion can have a rubber material or a similar material that aids a user in gripping the handle 308 of the imaging device mount 300.

The imaging device mount 300 includes the handle 308 with an integrated multi-configuration mounting system (i.e., the adapter 302 and the receptacle 304 that defines the opening 306 within the adapter 302), an arm 310 coupled to the handle 308, and a mount head 312 coupled to the arm 310. The imaging device mount 300 is in a collapsed mode when the arm 310 has not been extended from the handle 308 (as shown in FIG. 3) and is in an extension mode when the arm 310 has been extended from the handle 308. An imaging device (e.g., digital camera, action camera, smartphone, etc.) can be coupled to the mount head 312. The arm 310 can be extended in the extension mode resulting in the mount head 312 (with the coupled imaging device) being a predetermined distance (based on the length of the arm 310) away from the handle 308. When in the extension mode, the imaging device mount 300 can take POV shots, follow-cam footage, and selfies. In some embodiments, a remote can be coupled to the imaging device mount 300 via the adapter 302 to enable remote operation of the imaging device that is coupled to the mount head 312 in extension mode (i.e., when the imaging device mount 300 is in extension mode, it can be difficult to operate the imaging device without the remote). The arm 310 can also be detached from the handle 308 enabling the mount head 312 to be directly coupled to the handle 308 so that the imaging device mount 300 can be used as a camera grip device with an imaging device coupled to the mount head 312.

The receptacle 304 can receive a plurality of devices including but not limited to imaging devices, clip housings that secure devices (e.g., remotes, imaging devices, etc.), remote controllers (also referred to as remotes) that control the imaging devices or other devices, and other accessory devices (e.g., displays). The remotes can be utilized to more easily operate an imaging device coupled to a mount head of an imaging device mount that is in extension mode (i.e., an imaging device mount that has been extended away from a handle of the imaging device mount using a foldable arm of the imaging device mount).

Figure 4:
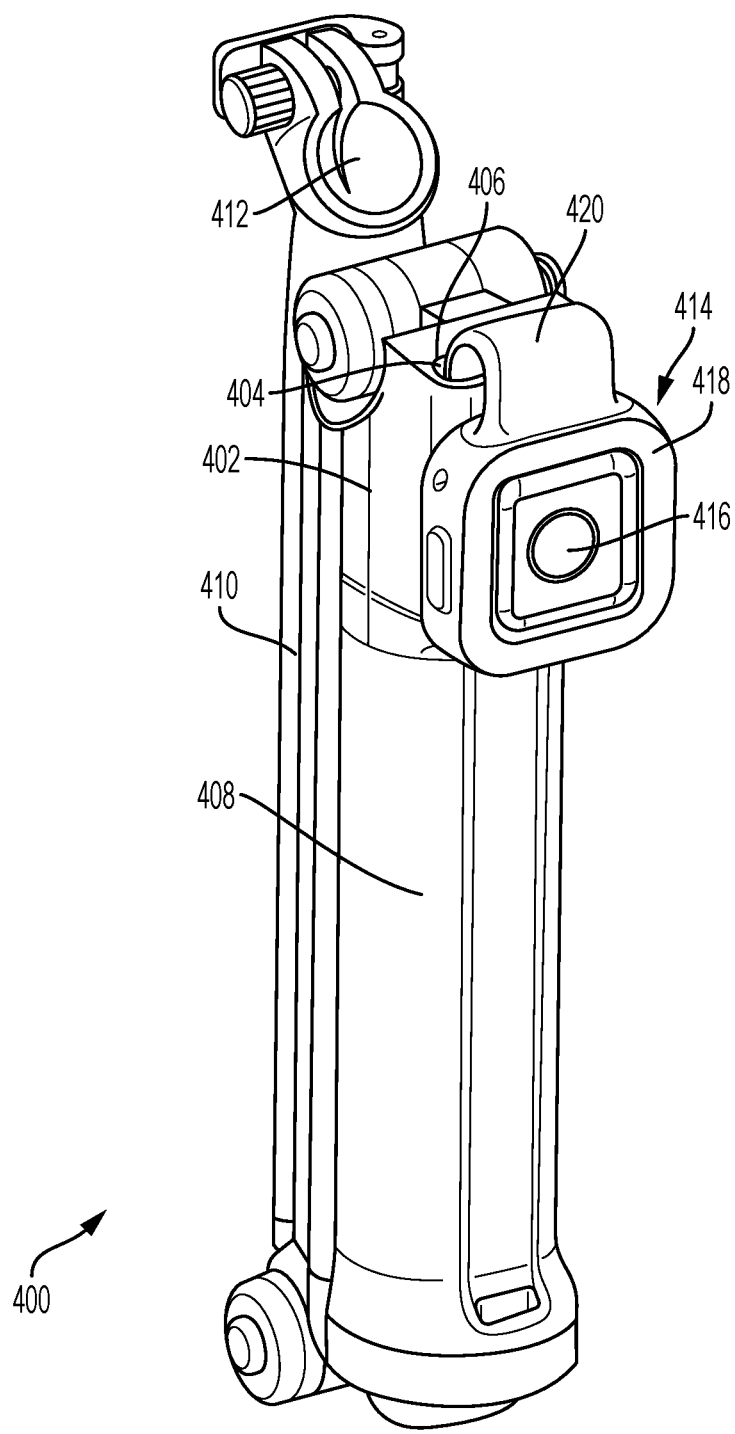
FIG. 4 illustrates an imaging device mount that is coupled to a clip housing in accordance with an embodiment of the present disclosure.

FIG. 4 illustrates an imaging device mount 400 that is coupled to a clip housing 414 in accordance with an embodiment of the present disclosure. Referring to FIGS. 3 and 4 together, the imaging device mount 400 can be similar to the imaging device mount 300 and can include an adapter 402 (i.e., similar to the adapter 302), a receptacle 404 defining an opening 406 in the adapter 402 (i.e., similar to the receptacle 304 defining the opening 306 in the adapter 302), a handle 408 (i.e., similar to the handle 308), an arm 410 coupled to the handle 408 (i.e., similar to the arm 310 coupled to the handle 308), and a mount head 412 coupled to the arm 410 (i.e., similar to the mount head 312 coupled to the arm 310). In FIG. 4, the imaging device mount 400 is also in a collapsed mode (like in FIG. 3) as opposed to an extension mode because the arm 410 is not extended away from the handle 408.

The imaging device mount 400 can be coupled to the clip housing 414 by receiving a portion of the clip housing 414 via the receptacle 404 of the adapter 402. The clip housing 414 can secure a device 416 using a frame 418 that surrounds and/or houses the device 416. The frame 418 can dynamically change shape using a configurable form factor to house a plurality of different devices with varying shapes and sizes. The device 416 can comprise a remote (e.g., a miniature remote, a smart remote) that enables a user of the imaging device mount 400 to operate an imaging device or camera that is coupled to the mount head 412 when the imaging device mount 400 is in an extension mode (i.e., when the mount head 412 is extended away from the handle 408 by the arm 410 for certain types of footage or shots). For example, the user can press a button on the device 416 that is coupled near a grip of the handle 408 to actuate the camera (e.g., actuate a shutter button of the camera) coupled to the imaging device mount 400. Pressing the button can trigger other actions including but not limited to switching settings (e.g., switching between different camera capture modes) associated with the camera coupled to the mount head 412 of the imaging device mount 400. The portion of the clip housing 414 can comprise a tab 420 that is inserted into the receptacle 404 to couple the clip housing 414 to the imaging device mount 400. The tab 420 can be a compliant material so that it forms an interference fit when inserted into a rigid structure of the receptacle 404. The tab 420 can include an active connection mechanism to form an active mechanical fit or can include a passive connection mechanism to form a passive mechanical fit.

Although the device 416 comprises a remote that is housed within the clip housing 414, the device 416 can be directly coupled to the imaging device mount 400 via a tab structure built into the device 416 (i.e., without using a clip housing such as the clip housing 414). For example, if the device 416 comprises a remote for controlling an imaging device or camera coupled to the mount head of the imaging device mount 400, the remote can be structured to include a tab that can fit into the receptacle 404 of the imaging device mount 400.

In addition, the device 416 can be a variety of other devices such as a portable display that is in wireless communication with an imaging device or camera attached to the mount head of the imaging device mount 400. The portable display can be any of a LCD, LED, or similar type of display. The portable display can enable a user of the imaging device mount 400 to view the footage that the imaging device is capturing when the imaging device mount 400 is in the extension mode when it would be difficult for the user to view the footage from a built-in display of the imaging device (if the imaging device comes with a built-in display). The device 416 can be a second imaging device so that while the user is capturing footage from a first imaging device coupled to the mount head of the imaging device mount 400, the second imaging device can take footage of the reaction of the user operating the imaging device mount 400 providing a dual camera and perspective mode functionality.

Figure 5:
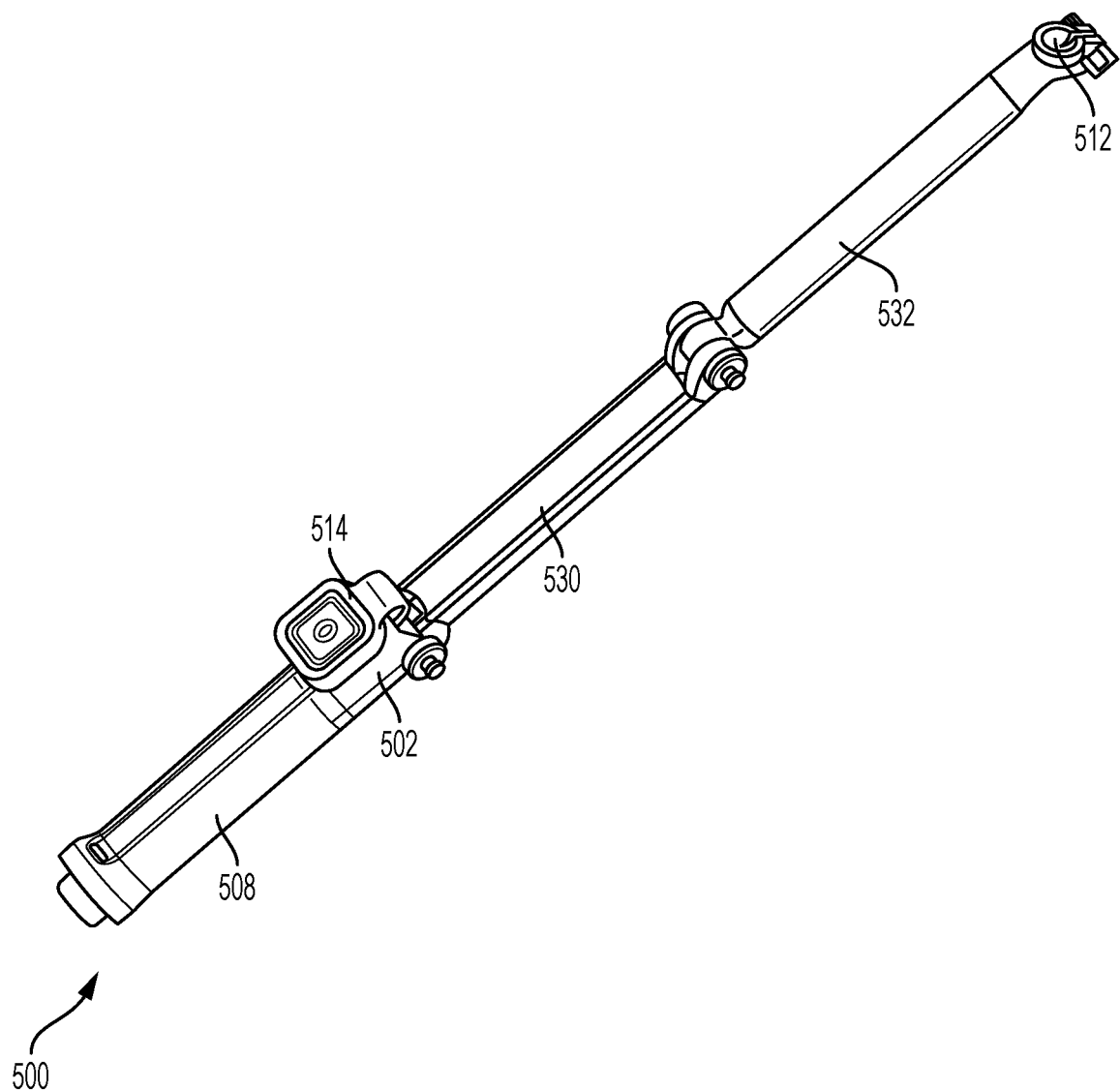
FIG. 5 illustrates an imaging device mount in an extension mode in accordance with an embodiment of the present disclosure.

FIG. 5 illustrates an imaging device mount 500 in an extension mode in accordance with an embodiment of the present disclosure. Referring to FIGS. 3, 4, and 5 together, the imaging device mount 500 can be similar to the imaging device mount 300 and can include an adapter 502 (i.e., similar to the adapter 302), a receptacle defining an opening in the adapter 502 (i.e., similar to the receptacle 304 defining the opening 306), a handle 508 (i.e., similar to the handle 308), an arm comprising a first segment 530 and a second segment 532, wherein the first segment 530 of the arm is coupled to the handle 508, and a mount head 512 coupled to the second segment 532 of the arm.

In FIG. 5, the imaging device mount 500 receives a clip housing 514 (i.e., similar to the clip housing 414) via the receptacle of the adapter 502 to secure a device including but not limited to a remote, an imaging device, and an imaging accessory. When a remote is secured to the handle 508 of the imaging device mount 500 via the clip housing 514 being inserted into the receptacle of the adapter 502, a user can more readily operate (e.g., actuate a shutter) an imaging device that is coupled to the mount head 512 and potentially out of reach. When extended, and dependent upon the number of segments of the arm (e.g., the first segment 530 and the second segment 532 are shown in FIG. 5), an imaging device coupled to the mount head 512 can be numerous feet away from a user that is gripping the imaging device mount 500 near the handle 508.

Figure 6:
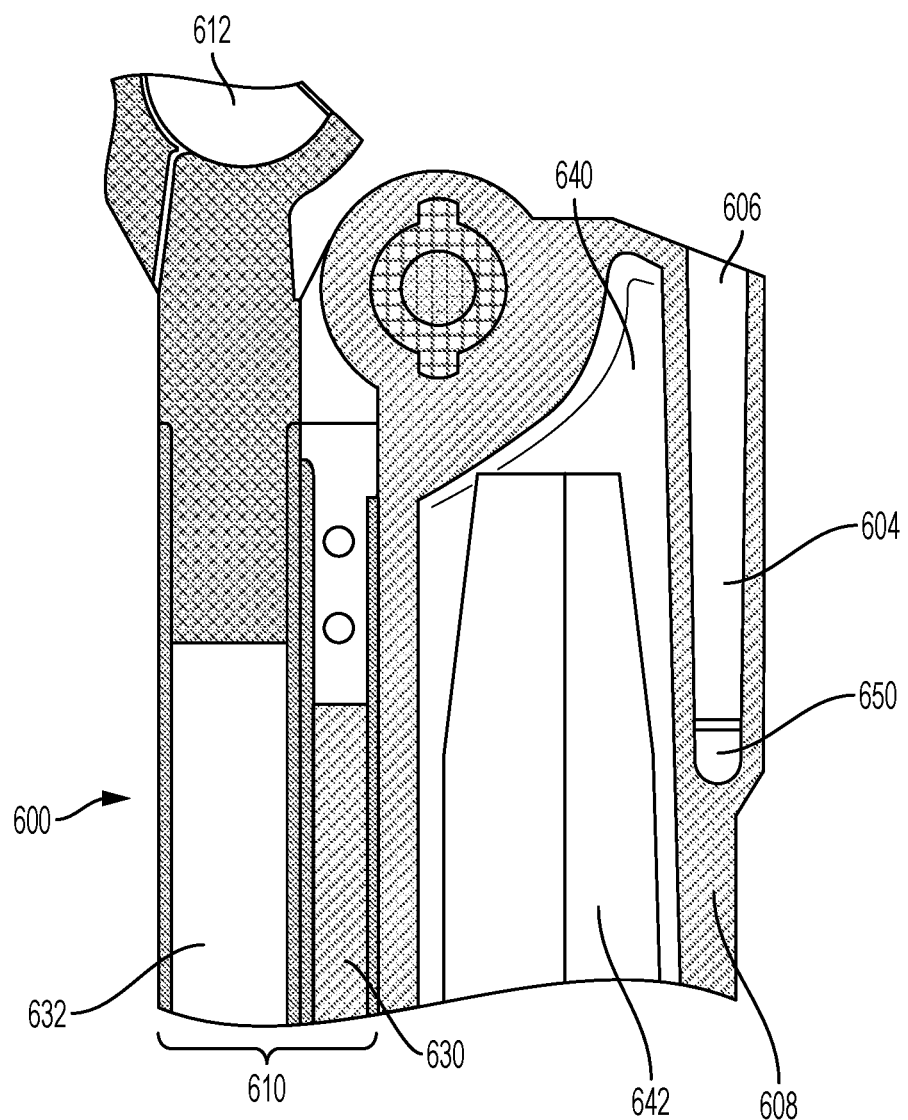
FIG. 6 illustrates a cross-section view of an imaging device mount in accordance with an embodiment of the present disclosure.

FIG. 6 illustrates a cross-section view of an imaging device mount 600 in accordance with an embodiment of the present disclosure. The imaging device mount 600 is similar to the imaging device mount 300 of FIG. 3 and can include an adapter 602, a receptacle 604 defining an opening 606 within the adapter 602, a handle 608 that the adapter 602 is integrated within, an arm 610 coupled to the handle 608, and a mount head 612 coupled to the arm 610. The arm 610 can have a plurality of segments to enable the imaging device mount 600 to switch from a collapsed mode to an extension mode. The arm 610 includes a first segment 630 and a second segment 632 (similar to the first segment 530 and the second segment 532 of FIG. 5). In addition, the imaging device mount 600 can have an internal storage cavity 640 that can store a plurality of devices including but not limited to a tripod 642. Other devices that can be stored within the internal storage cavity 640 include but are not limited to batteries, remote controllers, imaging devices, accessories, and displays.

In FIG. 6, the receptacle 604 has a tapered shape from top to bottom but other shapes can be utilized. For example, the receptacle 604, from top to bottom, narrow front-to-back (as shown in the cross-sectional view) and/or left-to-right. In some embodiments, the receptacle 604 and the opening 606 can each be shaped to a predetermined universal shape (i.e., a universal shape) that can fit a plurality of tabs of different material types and sizes. The receptacle 604 can be designed to receive both rigid tabs via a mechanical fit (e.g., using active or passive connection mechanisms) and compliant tabs via a friction or interference fit. The interference fit can enable a user to more quickly insert and/or remove a tab of a device (e.g., clip housing securing a remote, an imaging device, etc.) without having to engage the adapter 602 (e.g., engaging the adapter 602 by pressing on the sides of the adapter 602 to unlock the active/passive connection mechanism or having to pull the device out using a certain amount of force). The receptacle 604 can include a connection mechanism 650 (e.g., a mechanical retention feature) at the bottom of the receptacle 604 that locks an inserted tab of the device in place using a variety of connection mechanisms including but not limited to adhesives, tabs, bumps, slots, and hooks.

A first set of devices can be inserted into an adapter of a multi-configuration mounting system (e.g., the adapter 102 of the multi-configuration mounting system 100 of FIG. 1) that is coupled to a second set of devices. The multi-configuration mounting system thereby enables the first set of devices to interface with the second set of devices via the adapter of the multi-configuration mounting system. For example, a user can utilize a backpack (a device from the second set of devices) that has a built-in multi-configuration mounting system (e.g., the multi-configuration mounting system) and can clip a remote via a clip housing (a device from the first set of devices) to the multi-configuration mounting system. In this example, the clip housing and the embedded remote serve as devices within the first set of devices and the backpack serves as a device within the second set of devices. By utilizing the multi-configuration mounting system, the user can more readily secure and remove the clip housing with embedded remote from the backpack instead of, for example, having to unzip a storage compartment.

A certain device type can be part of both the first set of devices and the second set of devices. For example, an imaging device (e.g., camera) can include a tab that can be inserted into a receptacle of an adapter of a multi-configuration mounting system (e.g., the multi-configuration mounting system 200 of FIG. 2 sewn or embedded or manufactured into a backpack) thereby enabling a user to easily transport the camera using the backpack. In addition, the same device type (i.e., the imaging device) can include an integrated multi-configuration mounting system (e.g., the multi-configuration mounting system 100 of FIG. 1 molded into a rigid portion of the camera) that can receive, via a receptacle of an adapter of the multi-configuration mounting system, a tab of another device (e.g., a clip housing with a remote that can operate the camera) thereby enabling a user to easily transport the remote via the camera.

As aforementioned, a multi-configuration mounting system includes an adapter and a receptacle that defines an opening within a surface (e.g., top) of the adapter. The receptacle can receive a variety of devices when a corresponding portion or tab (i.e., a tab with a shape corresponding to a shape of the receptacle) is inserted into the receptacle. A clip housing with a tab that has a shape corresponding to a shape of a receptacle can house a variety of devices and can enable interfacing between the variety of devices and other devices that integrate and/or include the multi-configuration mounting system. The clip housing can include a universal frame shape (e.g., elastic rubber material frame with a rigid tab coupled to the frame) that can be stretched to house different sized devices (e.g., miniature remotes, smart remotes, cameras, etc.) or a different clip housing frame shape can be utilized to secure each of the different sized devices.

Figure 7:
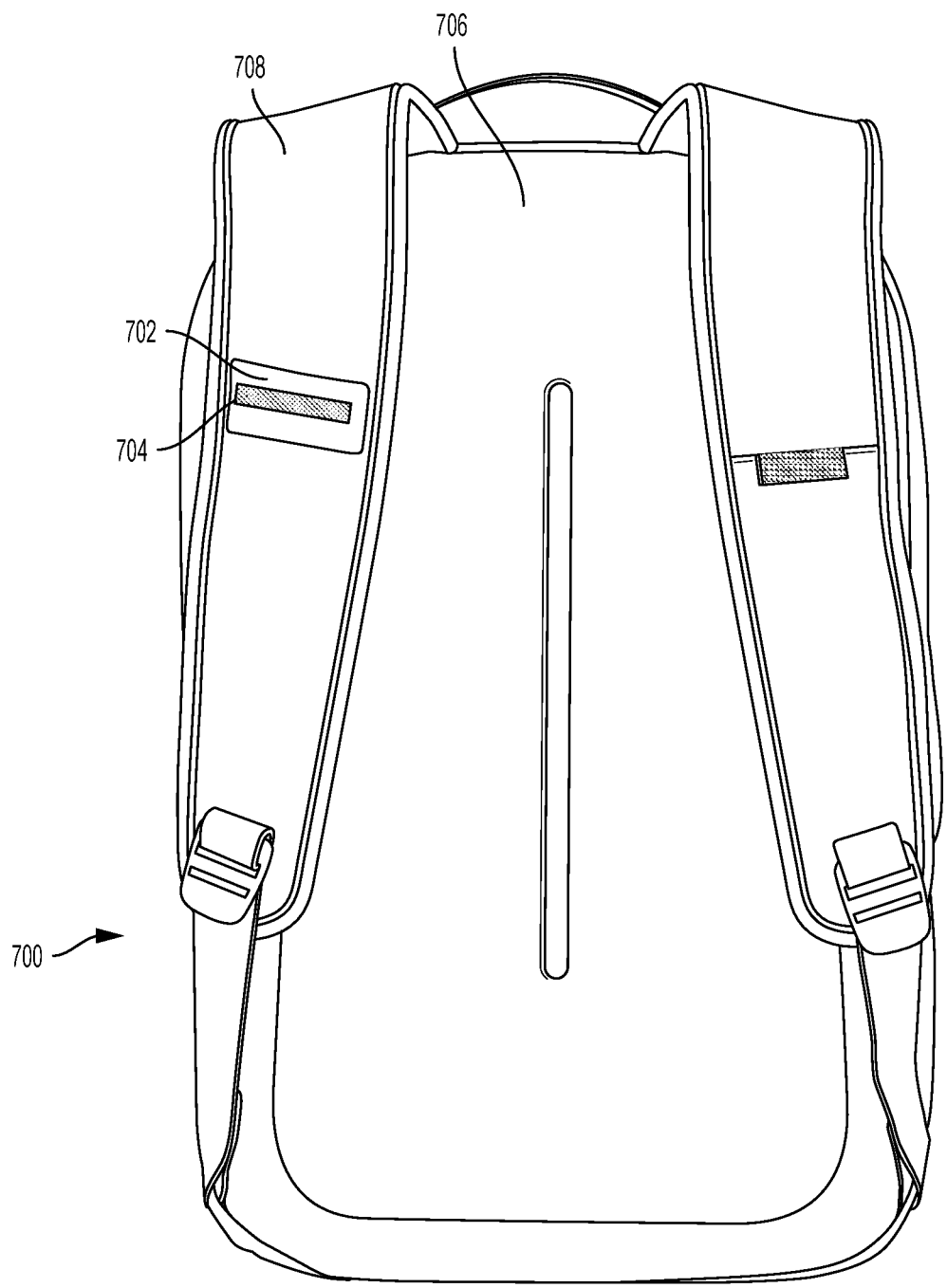
FIG. 7 illustrates a carrying device that includes an adapter of a multi-configuration mounting system in accordance with an embodiment of the present disclosure.

FIG. 7 illustrates a carrying device 700 that includes a multi-configuration mounting system 702 with an adapter 704 in accordance with an embodiment of the present disclosure. Referring to FIGS. 2 and 7 together, the multi-configuration mounting system 702 can be similar to the multi-configuration mounting system 200 of FIG. 2. The multi-configuration mounting system 702 includes the adapter 704 and a receptacle that defines an opening within a surface of the adapter 704. The receptacle can receive a tab associated with a device thereby enabling the device to be coupled to the carrying device 700 via the adapter 704 (i.e., the device can be an imaging device secured and can be coupled to the carrying device 700 when the tab associated with the device is inserted into the receptacle associated with the multi-configuration mounting system 702 that has been coupled to the carrying device 700).

The carrying device 700 can include a main body 706 and at least one strap 708. The carrying device 700 can have a variety of different designs and features. The multi-configuration mounting system 702 can be coupled to the at least one strap 708 (as shown in FIG. 7) or another area of the main body 706 or of the carrying device 700. The multi-configuration mounting system 702 can be coupled to the carrying device 700 via a variety of mechanisms including but not limited to the adapter 704 of the multi-configuration mounting system 702 being sewn into the carrying device 700. The adapter 704 of the multi-configuration mounting system 702 can include a flexible material (e.g., fabric, rubber, etc.) near certain areas (e.g., a flapped area similar to the flapped area 212 of FIG. 2) to enable the adapter 704 to be sewn into the carrying device 700.

Figure 8:
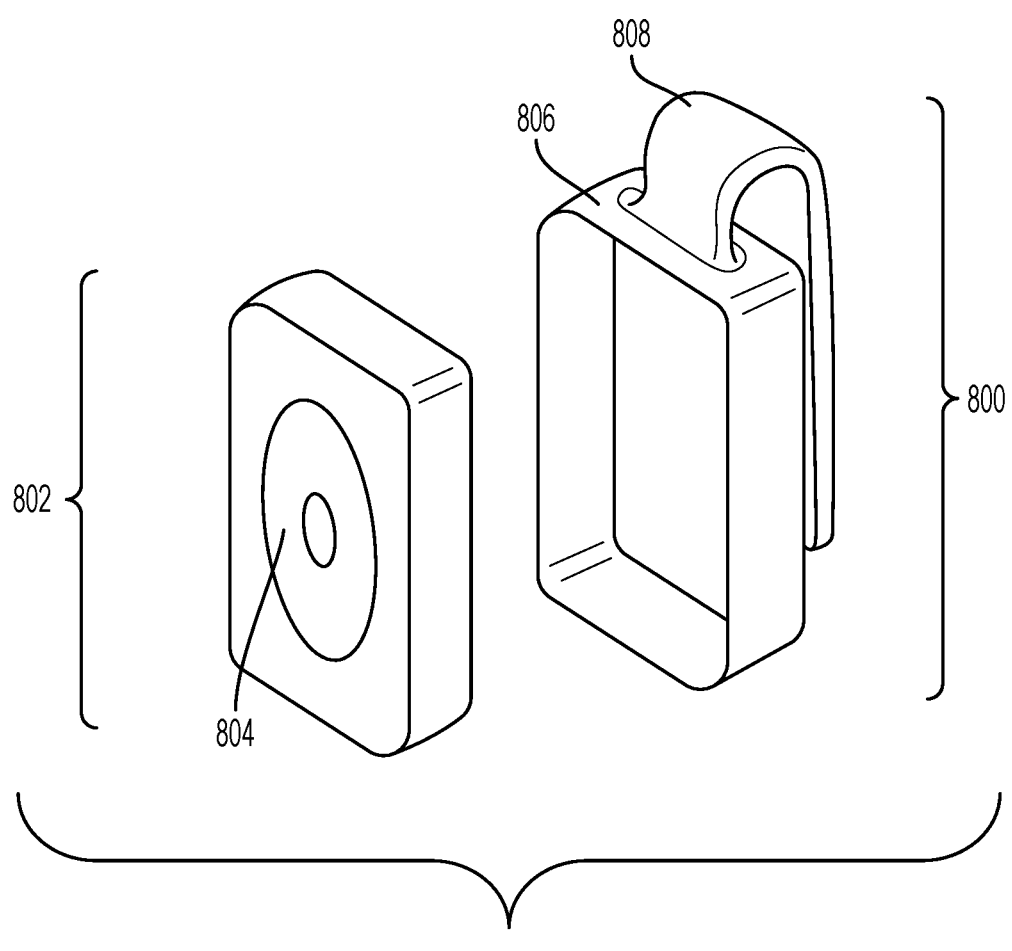
FIG. 8 illustrates a clip housing that secures a miniature remote device in accordance with an embodiment of the present disclosure.

FIG. 8 illustrates a clip housing 800 that secures a miniature remote device 802 in accordance with an embodiment of the present disclosure. The miniature remote device 802 can include a button 804 including but not limited to a click wheel button and a touch button to operate the miniature remote device 802. The clip housing 800 includes a frame 806 and a tab 808 coupled to the frame 806. The tab 808 includes a shape that corresponds with a shape of a receptacle of an adapter of a multi-configuration mounting system (not shown). The tab 808 can be inserted into the receptacle of the adapter of the multi-configuration mounting system (e.g., the multi-configuration mounting system 100 of FIG. 1 or the multi-configuration mounting system 200 of FIG. 2). The tab 808 can comprise a compliant material (e.g., rubber) or hybrid material (e.g., rubber surrounding a rigid core) to form an interference fit with the receptacle (e.g., rigid receptacle or compliant receptacle) when inserted. The tab 808 can comprise a rigid material (e.g., rigid plastic) to form a mechanical fit using either an active connection mechanism (e.g., quick release buckle or similar clipping/buckling mechanism) or a passive connection mechanism (e.g., sprung bulb bearings or similar bearing mechanism).

Figure 9:
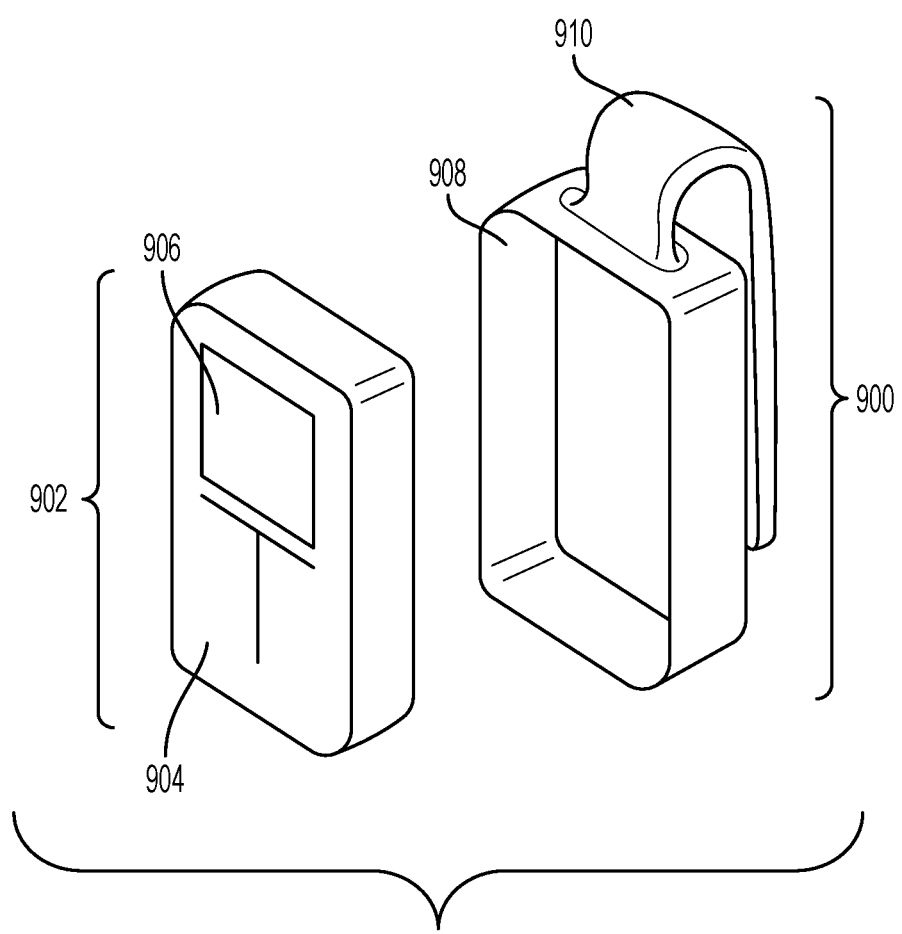
FIG. 9 illustrates a clip housing that secures a smart remote device in accordance with an embodiment of the present disclosure.

FIG. 9 illustrates a clip housing 900 that secures a smart remote device 902 in accordance with an embodiment of the present disclosure. The smart remote device 902 can include at least one button 904 and a display 906 to operate the smart remote device 902. The clip housing 900 includes a frame 908 and a tab 910 coupled to the frame 908. The tab 910 includes a shape that corresponds with a shape of a receptacle of an adapter of a multi-configuration mounting system (not shown). The tab 910 can be inserted into the receptacle of the adapter of the multi-configuration mounting system (e.g., the multi-configuration mounting system 100 of FIG. 1 or the multi-configuration mounting system 200 of FIG. 2). The tab 910 can comprise a compliant material (e.g., rubber) or a hybrid material (e.g., rubber surrounding a rigid core) to form an interference fit with the receptacle when inserted. The tab 910 can comprise a rigid material (e.g., rigid plastic) to form a mechanical fit using either an active connection mechanism (e.g., quick release buckle or similar clipping/buckling mechanism) or a passive connection mechanism (e.g., sprung bulb bearings or similar bearing mechanism).

Figure 10:
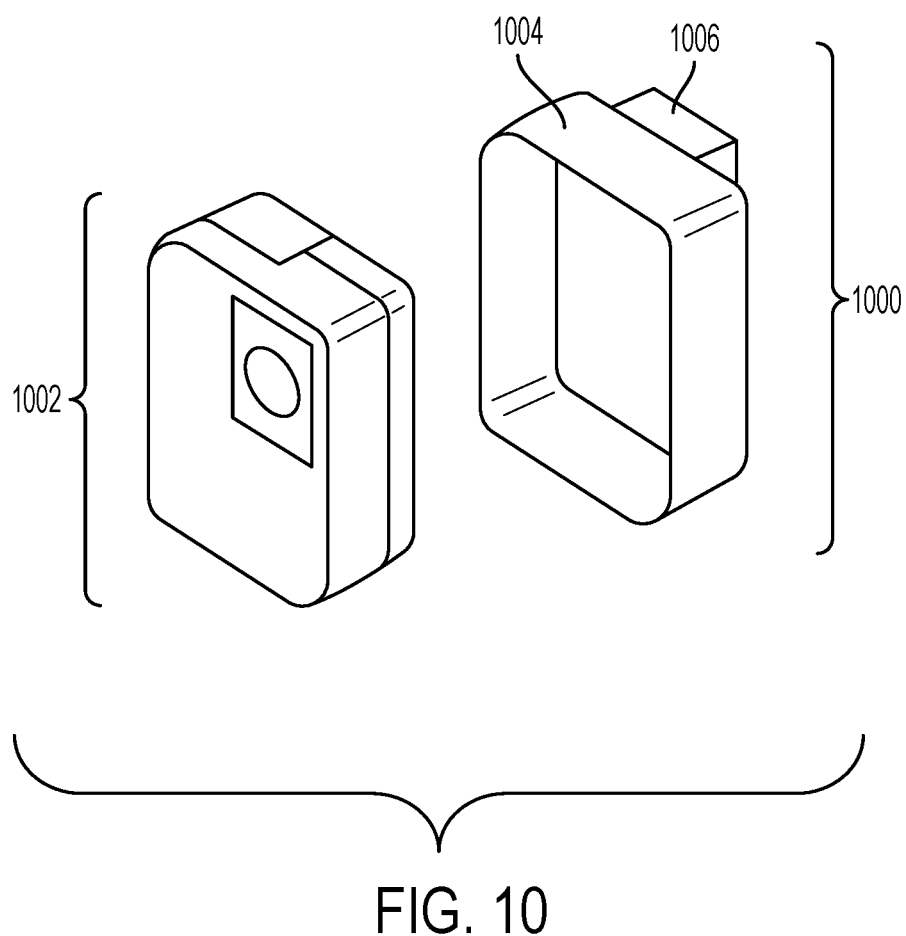
FIG. 10 illustrates a clip housing that secures a camera device in accordance with an embodiment of the present disclosure.

FIG. 10 illustrates a clip housing 1000 that secures a camera device 1002 in accordance with an embodiment of the present disclosure. The camera device 1002 can be a variety of cameras including but not limited to digital cameras, GoPro cameras, smartphone cameras, and portable removable cameras. The clip housing 1000 includes a frame 1004 and a tab 1006 coupled to the frame 1004. The tab 1006 includes a shape that corresponds with a shape of a receptacle of an adapter of a multi-configuration mounting system (not shown). The tab 1006 can be inserted into the receptacle of the adapter of the multi-configuration mounting system (e.g., the multi-configuration mounting system 100 of FIG. 1 or the multi-configuration mounting system 200 of FIG. 2). The tab 1006 can comprise a compliant material (e.g., rubber) or hybrid material (e.g., rubber surrounding a rigid core) to form an interference fit with the receptacle when inserted. The tab 1006 can comprise a rigid material (e.g., rigid plastic) to form a mechanical fit using either an active connection mechanism (e.g., quick release buckle or similar clipping/buckling mechanism) or a passive connection mechanism (e.g., sprung bulb bearings or similar bearing mechanism). In some embodiments, the camera device 1002 has an integrated tab to enable the camera device 1002 to be directly inserted (via the integrated tab) into the receptacle of the adapter of the multi-configuration mounting system without the need for the clip housing 1000.

Figure 11:
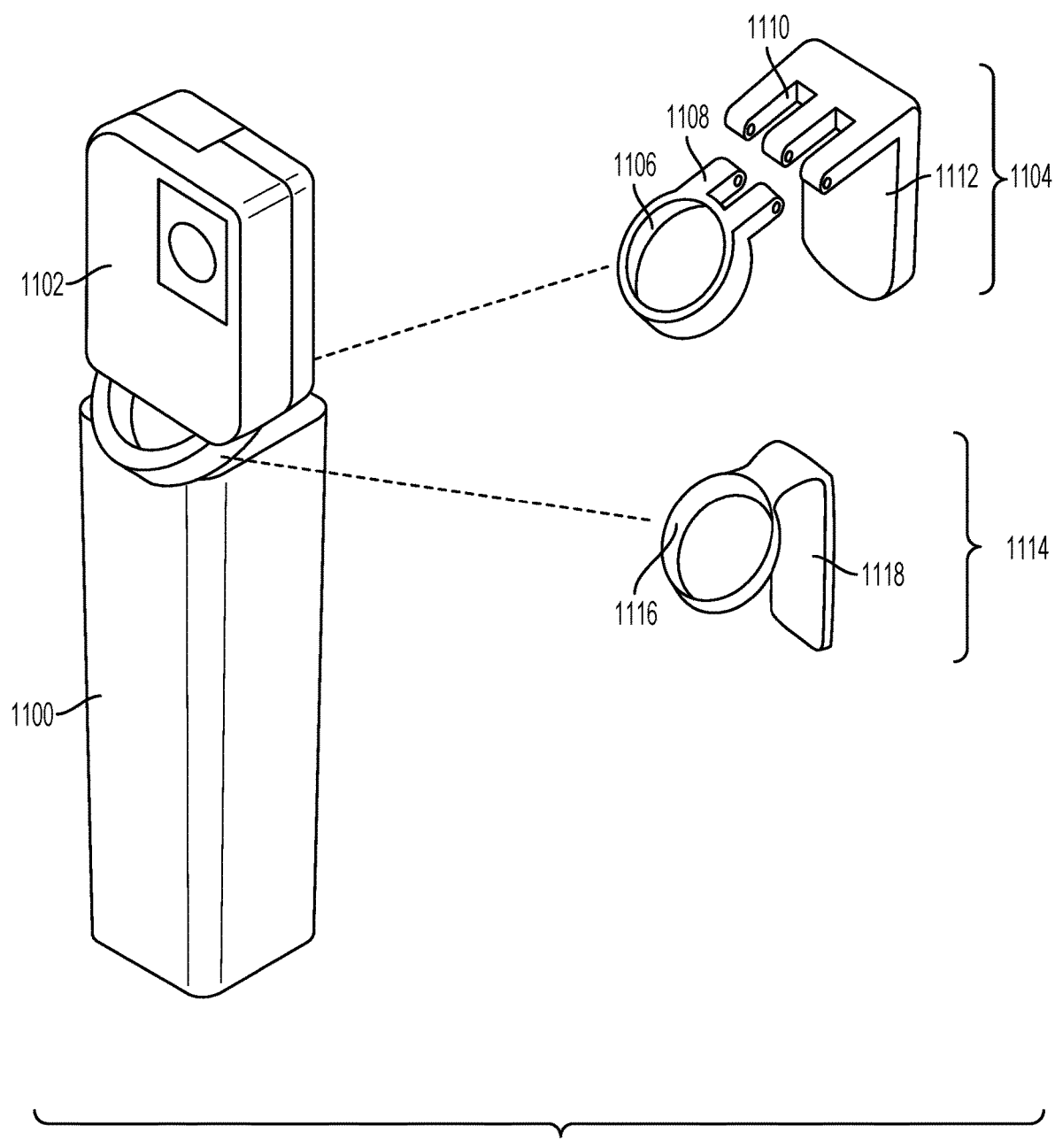
FIG. 11 illustrates a camera grip device in accordance with an embodiment of the present disclosure.

FIG. 11 illustrates a camera grip device 1100 in accordance with an embodiment of the present disclosure. The camera grip device 1100 can be coupled to an imaging device 1102 (e.g., a camera). The camera grip device 1100 can include an extension ring to enable the camera grip device 1100 (and the coupled imaging device 1102) to be attached to other devices (e.g., backpacks) that include a multi-configuration mounting system (e.g., the multi-configuration mounting system 100 of FIG. 1 or the multi-configuration mounting system 200 of FIG. 2). The extension ring can comprise a first extension device 1104 that includes a first component that comprises a ring 1106 on one end for coupling with the camera grip device 1100 and a first set of protruding fingers 1108 on an opposite end for coupling with a second component. The second component comprises a second set of protruding fingers 1110 on one end and a tab 1112 on an opposite end. The first set of protruding fingers 1108 is associated with and can couple to the second set of protruding fingers 1110. The tab 1112 can comprise a tab that can be inserted into a receptacle of an adapter of the multi-configuration mounting system (e.g., the multi-configuration mounting system 100 of FIG. 1 or the multi-configuration mounting system 200 of FIG. 2).

The extension ring can also comprise a second extension device 1114 that includes a ring 1116 on one end for coupling to the camera grip device 1100 and a tab 1118 on an opposite end that can be inserted into a receptacle of an adapter of the multi-configuration mounting system (e.g., the multi-configuration mounting system 100 of FIG. 1 or the multi-configuration mounting system 200 of FIG. 2). Unlike the first extension device 1104 that comprises two separate components (i.e., the first component comprising the ring 1106 and the first set of protruding fingers 1108 and the second component comprising the second set of protruding fingers 1110 and the tab 1112), the second extension device 1114 comprises only one singular component (the ring 1116 coupled to the tab 1118).

Figure 12:
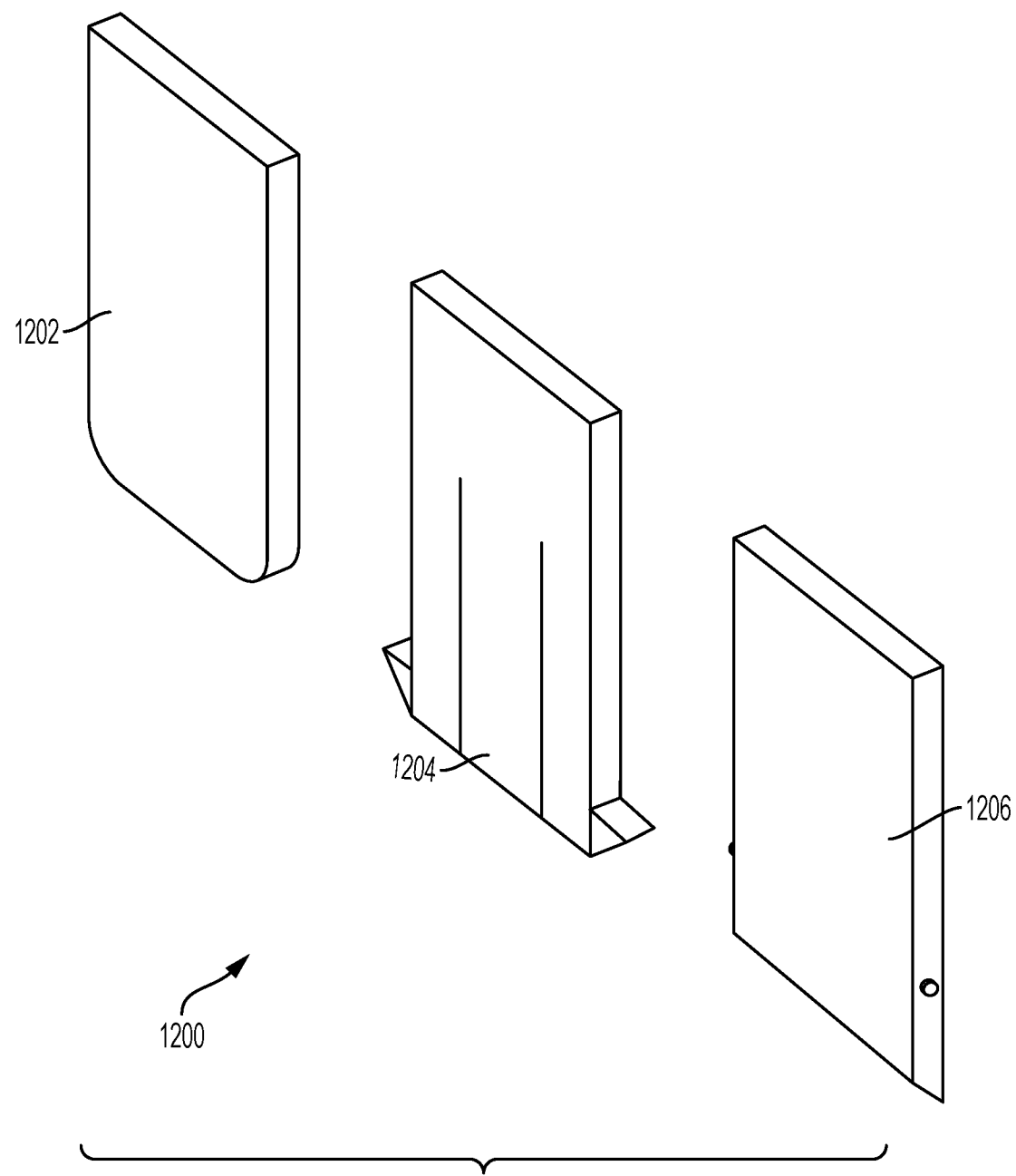
FIG. 12 illustrates a plurality of tabs for coupling with a multi-configuration mounting system in accordance with an embodiment of the present disclosure.

FIG. 12 illustrates a plurality of tabs 1200 for coupling with a multi-configuration mounting system in accordance with an embodiment of the present disclosure. The multi-configuration mounting system can be similar to the multi-configuration mounting system 100 of FIG. 1 and the multi-configuration mounting system 200 of FIG. 2. The multi-configuration mounting system (not shown) can include an adapter and a receptacle that defines an opening within a surface of the adapter. The receptacle can receive the plurality of tabs 1200 to form a variety of corresponding fits based on which of the plurality of tabs 1200 are received. The corresponding fits include but are not limited to a friction (interference) fit, an active mechanical fit, and a passive mechanical fit. The receptacle can have a universal shape (e.g., a rigid shape) that can receive the plurality of tabs 1200 or the receptacle can have varying shapes that conform to and are associated with each of the plurality of tabs 1200.

In FIG. 12, a tab 1202 can be inserted into the receptacle of the multi-configuration mounting system to form an interference fit. The tab 1202 can have a shape that is compliant. The tab 1202 can comprise a compliant material (e.g., rubber) or can comprise a hybrid material that comprises a mixture of compliant and rigid materials (e.g., a rigid core with a compliant rubber overmold around the rigid core such as a rigid plastic core surrounded by rubber).

A tab 1204 can include an active connection mechanism that can be inserted into the receptacle of the multi-configuration mounting system to form an active mechanical fit. The active connection mechanism can comprise a quick release buckle or similar mechanisms. The tab 1204 includes protrusions that extend and are sprung outward. As the tab 1204 is inserted into a receptacle (e.g., the receptacle 210), the protrusions are pushed inward by surfaces of the adapter that define the receptacle until being received outward by and retained in corresponding mechanical retention features (e.g., mechanical retention feature 650, such as a recess or detent) within the receptacle. To remove the tab 1204, the protrusions are pushed inward by the user to release the protrusions from the corresponding retention features, for example, by providing direct access to the protrusions (e.g., via apertures) or via a button, lever, or other mechanical actuator.

A tab 1206 can include a passive connection mechanism that can be inserted into the receptacle of the multi-configuration mounting system to form a passive mechanical fit. The passive connection mechanism can comprise sprung bulb bearings or similar mechanisms. For example, term "sprung bulb bearing" may include or otherwise refer to a sprung ball catch mechanism. As the tab 1206 is inserted into a receptacle (e.g., the receptacle 210), the ball is pushed inward by surfaces of the adapter that define the receptacle until being received outward by and retained in corresponding mechanical retention features (e.g., mechanical retention feature 650, such as a recess or detent) within the receptacle. As the tab 1206 is removed (e.g., pulled) from the receptacle, the ball or protrusion is engaged and pushed inward by the corresponding retention feature to allow removal of the ball or protrusion from the detent and, thereby, release of the tab 1206 from the receptacle. By the bulb bearing being operated by another action inherent to removing the tab 1206 (i.e., by pulling the tab 1206 out of the receptacle), the bulb bearing is considered a passive connection mechanism or as forming a passive mechanical fit.

A method and system in accordance with the present disclosure provides a multi-configuring mounting system. The multi-configuration mounting system (e.g., the multi-configuration mounting system 100 of FIG. 1 or the multi-configuration mounting system 200 of FIG. 2) comprises an adapter configured to couple to a first device and a receptacle defining an opening within a surface of the adapter, wherein the receptacle receives a tab of a clip housing that secures a second device, thereby forming an interference fit between the tab and the receptacle to couple the second device to the first device via the adapter. The second device can be any of an imaging device, an imaging accessory device, a remote configurable to operate the imaging device, a remote configurable to operate the imaging accessory device. The clip housing (e.g., the clip housing 414 of FIG. 4) comprises a frame coupled to the tab, wherein the frame secures the second device and the tab forms the interference fit when inserted into the receptacle. In some embodiments, defining an opening within a surface of the adapter comprises defining the opening with a top surface of the adapter.

The adapter can be removably coupled to the second device when the receptacle receives the tab of the clip housing. The first device can interface with another surface of the adapter including but not limited to a backside surface of the adapter. Therefore, the other surface of the adapter is configured to couple to the first device. The first device can be any of a rigid device, a flexible device, and a hybrid device (comprising portions that are both rigid and flexible). The rigid device can comprise an imaging device mount and the flexible device can comprise any of a carrying case, a bag, a backpack, a clothing article, and a wearable device.

When the first device is a rigid device, the adapter can comprise a rigid plastic structure molded into the rigid device. When the first device is a flexible device, the adapter can comprise a rubber (or similar material) structure sewn into a fabric (or similar material) surface of the flexible device. The receptacle can have a shape that corresponds to a shape of the tab of the clip housing. The shape of the receptacle can be rigid and can be tapered from top to bottom. The shape of the tab can be compliant, wherein the tab comprises an elastic material (e.g., any of a rubber material or a similar material, and a hybrid material such as a rigid plastic core with a rubber overmold or a similar hybrid material) to form an interference fit when inserted into the receptacle. The shape of the tab can also include an active connection mechanism to form an active mechanical fit when inserted into the receptacle. The shape of the tab can also include a passive connection mechanism to form a passive mechanical fit when inserted into the receptacle. The second device can be any of an imaging device, an imaging accessory device, a remote configurable to operate the imaging device, or a remote configurable to operate the imaging accessory device.

A method and system in accordance with the present disclosure also provides a multi-configuration mounting system within an imaging device mount. The imaging device mount (e.g., the imaging device mount 300 of FIG. 3) comprises a handle, wherein the handle includes the adapter with a receptacle that defines an opening with a surface of the adapter and the receptacle receives a tab associated with a second device; an arm movably secured to the handle such that the arm can be rotated relative to the handle and secured in place, wherein the arm comprises a plurality of segments (e.g., the first segment 510A and the second segment 510B of FIG. 5) that are movably secured to each other; and a mount head movably secured to the arm such that the mount head can be rotated relative to the handle and secured in place, wherein the mount head is configurable to mount an imaging device (e.g., a camera).

The adapter can be a rigid plastic structure molded into and protruding outwards from a top end of a front surface of the handle. The top end of the handle can be located above a grip portion of the handle near a lower end of the handle. The adapter can be shaped in a variety of different shapes including a shape that is flush with the handle and that does not protrude outwards. The receptacle can have a rigid shape that corresponds to a shape of the tab. The shape of the tab can be any of compliant, a shape that includes an active connection mechanism (e.g., quick release buckle or a similar mechanism), and a shape that includes a passive connection mechanism (e.g., sprung bulb bearings or a similar mechanism). An interference fit can be formed when the tab that has a shape that is compliant is inserted into the receptacle. An active mechanical fit can be formed when the tab that has a shape that includes an active connection mechanism is inserted into the receptacle. A passive mechanical fit can be formed when the tab that has a shape that includes a passive connection mechanism is inserted into the receptacle.

A method and system in accordance with the present invention provides a multi-configuration mounting system. The multi-configuration mounting system can comprise a first device having an adapter and a receptacle defining an opening within a surface of the adapter. The opening can be configured to receive a tab associated with a second device, thereby forming one of an interference fit, an active mechanical fit, or a passive mechanical fit between the tab and the receptacle to removably couple the second device to the first device via the adapter. The surface can be a top surface of the adapter. Another surface of the adapter can be configured to couple to the first device. The first device can be one of a rigid device or a flexible device. The rigid device can be an imaging device mount. With a rigid first device, the adapter can comprise a rigid plastic structure molded into the rigid device. The flexible device can be any or one of a carrying case, a bag, a backpack, a clothing article, and/or a wearable device. With a flexible first device, the adapter can comprise a rubber structure sewn or otherwise coupled into a fabric surface of the flexible first device.

A shape of the receptacle can correspond to a shape of the tab. The shape of the receptacle can be tapered from top to bottom. The shape of the receptacle narrows from top to bottom. The receptacle can be rigid. The receptacle can include a mechanical retention feature therein. The multi-configuration mounting system can further comprise the second device. The second device can be any or one of an imaging device, an imaging accessory device, a remote configurable to operate an imaging device, and/or a remote configurable to operate an imaging accessory device. The imaging accessory device can be a display.

The multi-configuration mounting system can further comprise the imaging device. The multi-configuration mounting system can further comprise the remote configured to operate an imaging accessory device. The multi-configuration mounting system can further comprise the imaging accessory device that is a display. The multi-configuration mounting system can further comprise the tab. The tab can be removably coupled to the second device. The multi-configuration mounting system can further comprise a clip housing that includes the tab and a frame coupled to the tab, the frame securing the second device. The second device can include the tab. The tab can be irremovable from the second device. The tab can form the interference fit when inserted into the receptacle. The tab can be compliant. The tab can include a rubber material. The tab can be formed by the rubber material overmolded to a rigid core. The tab can include different materials including but not limited hybrid materials.

The tab can form the active mechanical fit when inserted into the receptacle. The tab can include one or more protrusions that are sprung outward, and the receptacle can include one or more corresponding mechanical retention features that receive and retain the one or more protrusions therein. To remove the tab from the receptacle, the protrusions can be configured to be pressed inward by a user. The tab can form the passive mechanical fit when inserted into the receptacle. The tab can include one or more balls that are sprung outward, and the receptacle can include one or more corresponding mechanical retention features that receive and retain the one or more balls therein. To remove the tab from the receptacle, the balls can be pressed inward by mechanical retention by a user pulling the tab from the receptacle. The multi-configuration mounting system can further comprise a third device that is coupleable to the first device. The second device can be a remote control for operating the third device, and the third device can be an imaging device. The first device can be an imaging device mount. The imaging device mount can function as one or more of an imaging device grip, an extension arm, or a tripod. The imaging device mount can function as all of an imaging device grip, an extension arm, and a tripod.

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements that are not in direct contact with each other, yet still co-operate or interact with each other, or are structured to provide a thermal conduction path between the elements.

Likewise, as used herein, the terms "includes," "comprising," "including," "has," "having," or any other variation thereof, are intended to cover a non-exclusive inclusion. For example, a process, method, article, or apparatus that includes a list of elements is not necessarily limited to only these elements but may also include other elements not expressly listed to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein, any reference to "one embodiment" or "an embodiment" or "some embodiments" means that a particular element, feature, structure, or characteristic described in connection with the embodiment is included in at least one embodiment. The appearances of the phrase "in one embodiment" or "in some embodiments" in various places in the specification are not necessarily all referring to the same embodiment.

Upon reading this disclosure, those of skill in the art will appreciate still additional alternative structural and functional designs for a multi-configuration mounting system as disclosed from the principles herein. Thus, while particular embodiments and applications have been illustrated and described, it is to be understood that the disclosed embodiments are not limited to the precise construction and components disclosed herein. Various modifications, changes, and variations, which will be apparent to those skilled in the art, may be made in the arrangement, operation, and details of the method and apparatus disclosed herein without departing from the spirit and scope defined in the appended claims.

What is claimed is:
1. A multi-configuration mounting system, comprising:
an adapter configured to couple to a first device; and
a receptacle defining an opening within a slanted surface of the adapter, the receptacle receiving a tab of a clip housing that secures a second device, thereby forming an interference fit between the tab and the receptacle to couple the second device to the first device via the adapter, wherein the tab extends away from a top of a frame of the clip housing, bends, and then extends toward a bottom of the frame, a free end of the tab being positioned closer to the bottom of the frame than the top of the frame, wherein the slanted surface of the adapter is formed by a rear height of the adapter being greater than a front height of the adapter, wherein a rear of the adapter is closer to the first device than a front of the adapter when the adapter is coupled to the first device, wherein the first device is a flexible device, wherein the flexible device comprises one of a carrying case, a bag, or a backpack, and wherein the adapter comprises a flexible structure sewn into a fabric structure of the flexible device.

2. The multi-configuration mounting system of claim 1, wherein the clip housing comprises a frame coupled to the tab, the frame securing the second device and the tab forming the interference fit when inserted into the receptacle.

3. The multi-configuration mounting system of claim 1, wherein defining an opening within a slanted surface of the adapter comprises defining the opening within a top surface of the adapter that is slanted toward the front of the adapter.

4. The multi-configuration mounting system of claim 1, wherein the adapter is removably coupled to the second device when the receptacle receives the tab of the clip housing.

5. The multi-configuration mounting system of claim 1, wherein another surface of the adapter is configured to couple to the first device.

6. The multi-configuration mounting system of claim 1, wherein a shape of the receptacle corresponds to a shape of the tab of the clip housing.

7. The multi-configuration mounting system of claim 6, wherein the shape of the tab is compliant, and wherein the tab comprises an elastic material to form the interference fit.

8. The multi-configuration mounting system of claim 7, wherein the elastic material includes any of a rubber material and a hybrid material comprising a rigid core with a rubber overmold.

9. The multi-configuration mounting system of claim 1, wherein the second device is one of an imaging device, an imaging accessory device, a remote configurable to operate the imaging device, or a remote configurable to operate the imaging accessory device.

10. A mounting system comprising:

a rubber structure sewn into a fabric surface of a flexible device; and a receptacle defining an opening within a slanted surface of the rubber structure, the receptacle receiving a tab of a clip housing that secures a rigid device to the flexible device, thereby forming an interference fit between the tab and the receptacle to couple and secure the rigid device to the flexible device via the rubber structure, wherein the slanted surface of the rubber structure is formed by a rear portion of the slanted surface being vertically higher than a front portion of the slanted surface when the flexible device is in an upright position, wherein the flexible device comprises one of a carrying case, a bag, or a backpack, and wherein the receptacle comprises a flexible structure sewn into a fabric structure of the flexible device.

11. A multi-configuration mounting system, comprising;

an adapter configured to couple to a first device, the adapter having a receptacle with an opening on a top surface of the adapter, the top surface slants downwards toward a front surface of the adapter so that an obtuse angle is formed between the top surface and the front surface of the adapter; and a clip housing configured to couple to a second device, the clip housing having a tab with a first end extending from a top of a frame and a second end closer to a bottom of the frame than the top of the frame, the second end of the tab being configured to be received within the receptacle of the adapter to form an interference fit between the tab and the receptacle to couple the second device to the first device via the adapter, wherein the frame is configured to stretch around at least a top and a bottom of the second device, wherein the first device is a flexible device, wherein the flexible device comprises one of a carrying case, a bag, or a backpack, and wherein the adapter comprises a flexible structure sewn into a fabric structure of the flexible device.

12. The multi-configuration mounting system of claim 11, wherein a shape of them receptacle corresponds to a shape of the tab of the clip housing.

* * * * *